May 7, 1963   R. L. HICKEY ETAL   3,089,042
CONTINUOUS OUTLET SURFACE EXTENSION ASSEMBLY
Filed Jan. 26, 1959   2 Sheets-Sheet 1
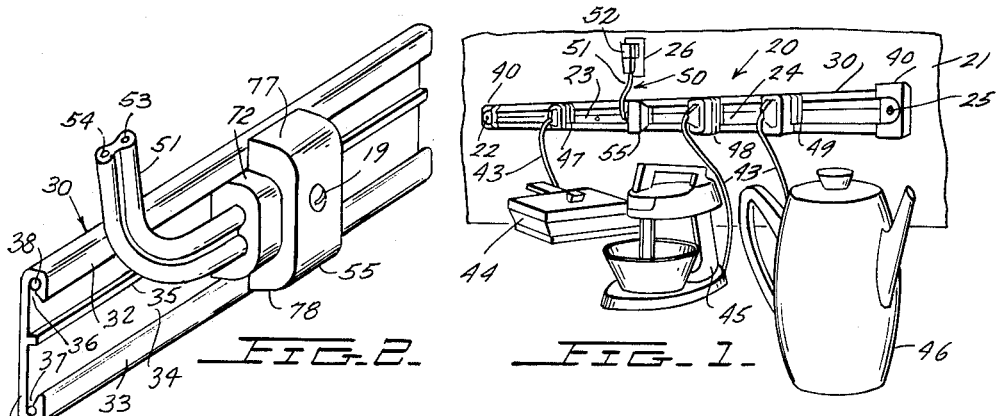
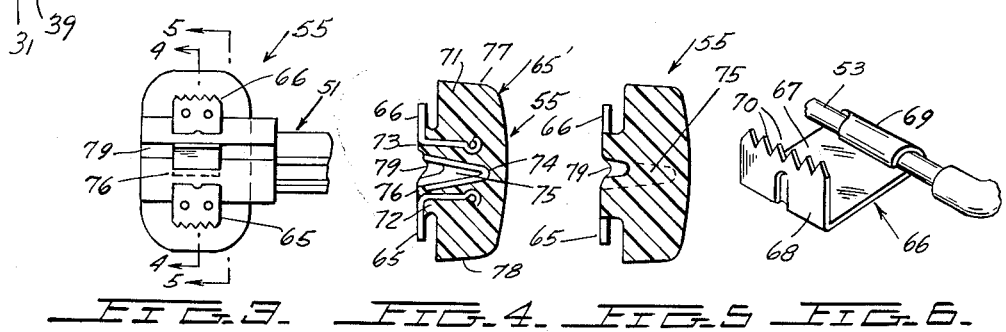
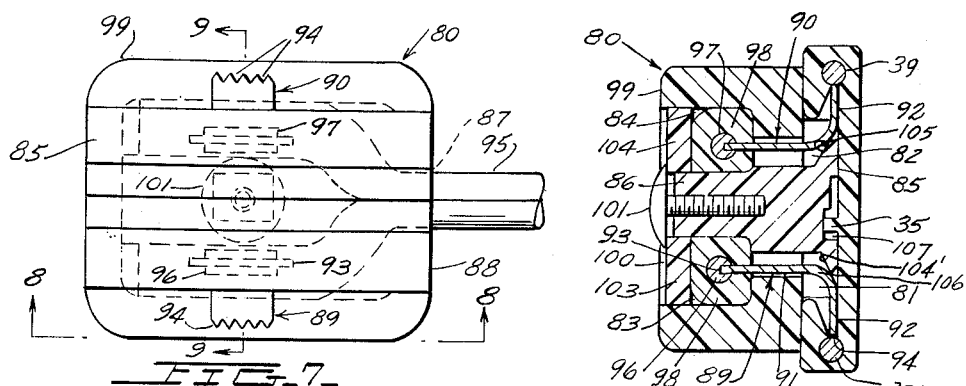
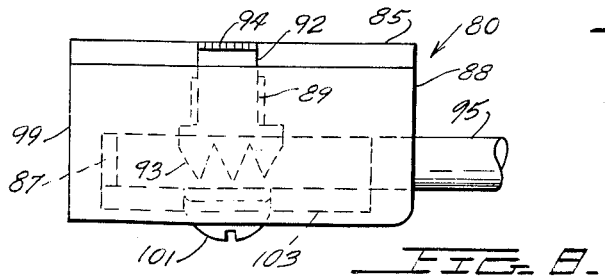
INVENTORS
ROBERT L. HICKEY
LOUIS W. HIGGINS
ELWOOD T. PLATZ
BY
ATTORNEYS

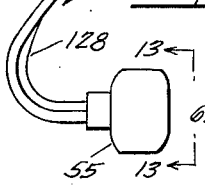
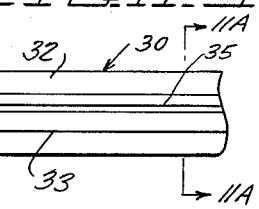
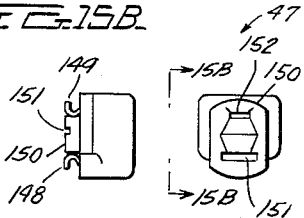
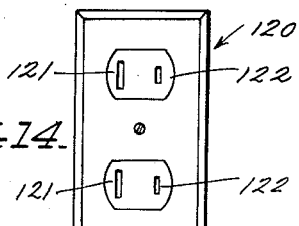
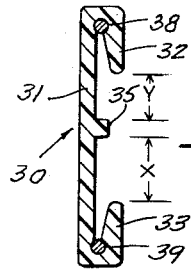
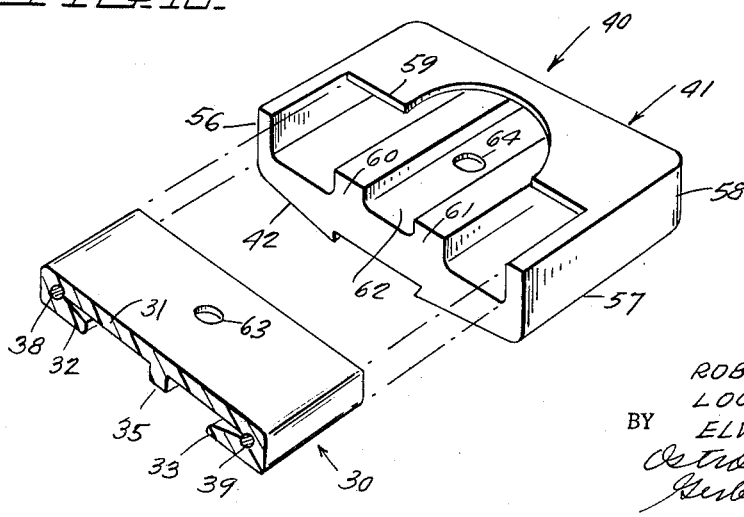

United States Patent Office 3,089,042
Patented May 7, 1963

3,089,042
CONTINUOUS OUTLET SURFACE EXTENSION ASSEMBLY
Robert L. Hickey, St. Clair Shores, and Louis W. Higgins and Elwood T. Platz, Detroit, Mich., assignors to I-T-E Circuit Breaker Company, Philadelphia, Pa., a corporation of Pennsylvania
Filed Jan. 26, 1959, Ser. No. 789,112
1 Claim. (Cl. 307—147)

The instant invention generally relates to a continuous outlet electrical system and more particularly a system of this type having a cable of a selected length and a non-removable feed-in plug adjustably mounted to the cable whereby the cable may be energized at a point along the length thereof conveniently located with respect to a surface mounted electrical outlet which furnishes the energizing potential.

The prior art in attempting to provide electrical outlet surface extensions has usually resorted to arrangements wherein the receptacles mounted to the extension, once mounted to the extension are thereafter fixedly placed so that they cannot be moved without exposing cable conductors. Similarly, the energizing means for the extension is usually secured thereto at a fixed point so as to limit the position of the extension relative to the energizing receptacle.

However, there is one continuous outlet electrical system which is energized by means of a slidable feed-in plug. In this arrangement the plug contacts are, at all times, in sliding engagement with the cable conductors. If the cable conductors should be covered with paint or dirt and thereafter the feed-in plug moved to a new location, the plug contacts have no means whereby they may penetrate dirt or paint so that the system cannot be energized while the feed-in plug is located at positions at which the cable conductors are coated with paint or dirt.

The device of the instant invention comprises a continuous outlet cable of selected length that can be safely and simply installed on a surface and then electrically energized from an existing outlet receptacle. The cable is provided with pre-punched holes for ease of installation and can be of any convenient length, such as 4 feet, 6 feet, etc., that may be selected for sales, production, or other reasons. The feed-in plug which is utilized to energize the cable may be moved to any point along the length thereof. This adjustment permits the cable to be mounted in any desired relationship to the outlet from which the cable is to be energized. After the feed-in plug is mounted to the cable, end caps are secured as by rivets or cement, to each end of the cable to prevent future removal of the feed-in plug thereby preventing the contacts of the feed-in plug from being accessible to a human being. The extension assembly is also provided with a plurality of outlet receptacles which may be conveniently dismounted from the cable and thereafter remounted in different locations which are conveniently placed with respect to the appliances which are to be energized.

One form of the feed-in plug comprises a yieldable body which carries a pair of conducting engaging contacts and a biasing means which urges the contacts in diverging directions. The free ends of the contacts are provided with sharp teeth which are urged against the cable conductors to thereby penetrate coatings of dirt and/or paint and also prevent the feed-in plug from accidentally being moved along the length of the cable. To change the location of the feed-in plug the yieldable body is compressed thereby relieving some of the contact pressure between the contacts and conductors so that the plug may now slide along the cable.

In another embodiment of the feed-in plug a body of rigid material is provided having suitably formed recesses wherein one of the end portions of the contacts are disposed. A cap member is removably secured to the body by means of a screw in a manner such that the cap bears against the conductors of the flexible cable. This forces cable conductors against the contacts which in turn forces the contacts against suitably formed formations of the recess which direct the contacts in diverging directions to firmly engage the cable conductors.

Accordingly, a primary object of the instant invention is to provide a novel continuous outlet surface extension assembly that can be safely and simply installed.

Another object is to provide a novel feed-in plug for the extension assembly which is movable to any point along the length of the extension so that mounting of the extension with respect to the energizing wall outlet receptacle is exceptionally flexible.

Still another object is to provide a novel construction for a feed-in plug including means whereby the plug contacts will pierce any paint or dirt accumulations which may coat the cable conductors.

A further object is to provide a completely polarized continuous electrical outlet surface extension assembly.

These as well as other objects of the instant invention shall become readily apparent after reading the following description of the accompanying drawings in which:

FIGURE 1 is a perspective view of the continuous electrical outlet surface extension assembly of the instant invention mounted to a surface and energized from an outlet receptacle mounted to this surface, with a plurality of appliances energized from the extension assembly.

FIGURE 2 is a fragmentary perspective view illustrating the feed-in plug mounted to a continuous outlet cable.

FIGURE 3 is a back view of the feed-in plug of FIGURE 2.

FIGURES 4 and 5 are cross-sections of FIGURE 3 taken through lines 4—4 and 5—5, respectively, looking in the direction of the arrows.

FIGURE 6 is a perspective view of a conductor engaging contact of the feed-in plug of FIGURES 3–5.

FIGURE 7 is a bottom view of another embodiment of a feed-in plug.

FIGURE 8 is a side view of the feed-in plug of FIGURE 7 looking in the direction of arrows 8—8.

FIGURE 9 is a cross-section of the feed-in plug of FIGURE 7 taken through line 9—9 looking in the direction of the arrows with the feed-in plug being mounted to a continuous outlet cable.

FIGURE 10 is a perspective view of an end cap for the continuous outlet cable.

FIGURE 11 is a front elevation of a portion of continuous outlet cable.

FIGURE 11A is a cross-section taken through line 11A—11A of FIGURE 11 looking in the direction of the arrows.

FIGURE 12 is a front elevation view of an energizing extension.

FIGURE 13 is a side elevation of the feed-in plug of FIGURE 12 looking in the direction of arrows 13—13.

FIGURE 14 is a front elevation of a polarized wall receptacle.

FIGURE 15A is a front elevation of a twist type removable receptacle.

FIGURE 15B is a side elevation of the receptacle of FIGURE 15A looking in the direction of arrows 15B—15B.

Now referring to the figures, continuous outlet surface extension assembly designated generally by numeral 20 is shown in FIGURE 1 as being mounted to wall surface 21, by means of screws 22–25 at a point below wall outlet receptacle 26. Extension assembly 20 comprises a continuous outlet cable 30 of a convenient selected length. That is, the length of cable 30 is of a convenient length such as two, four, six or more feet as well as an inbetween length which is appropriate for a given purpose. In the case of an extension assembly which is to be mounted above a home kitchen counter (not shown) a four foot length would seem to be appropriate.

Continuous outlet cable 30 is of the type described in the Frank et al. copending application 556,907, filed January 3, 1956, now Patent No. 2,924,804, issued February 9, 1960, entitled "Electric Distribution System," and assigned to the assignee of the instant invention. Electrical energy is supplied from wall receptacle 26 to cable 30 by means of energizing extension 50 which comprises a flexible cable 51 of two wires 53, 54 having a conventional plug cap 52 at one end thereof which is mated to receptacle 26. At the other end of flexible cable 51 is a feed-in plug 55 which is mounted to continuous outlet cable 30.

A plurality of removable receptacles, in this case three 47–49, are mounted to cable 30 with each of the receptacles 47–49 being of the type disclosed in the Frank et al. copending application 556,905, filed January 3, 1956, now Patent No. 2,943,292, issued June 28, 1960 entitled "Electric Receptacle," and assigned to the assignee of the instant invention.

The receptacles 47–49 are, as shown in FIGURE 1, utilized to energize electrical appliances 44–46, respectively, through their individual extension cords 43.

Briefly, continuous outlet cable 30 comprises an elongated flat body portion 31 of a plastic insulating material which is deformable to comply with the contour of wall 21. A pair of integrally formed inwardly projecting lips 32, 33 are positioned along the long edges of body portion 31 to overlie the front face 34 of body portion 31 thereby forming narrow longitudinally extending slots 36, 37. An integrally formed rib 35 extends forward from front surface 34 and is positioned to one side of the midpoint between the free ends of lips 32, 33 for polarizing purposes, as will be hereinafter explained. The cable conductors 38, 39 are partially imbedded in body portion 31 beneath lips 32, 33, respectively, so as to be accessible through slots 36, 37, respectively.

Each end of cable 30 is covered by an end cap 40 so that the ends of conductors 38, 39 are not accessible. Each end cap 40 comprises a molded rectangular casing 41 closed at the front 42 and three sides 56–58. The back is partially closed by a thin flat formation 59 while the side opposite side 58 is completely open. A pair of stiffening ribs 60, 61 extending parallel to sides 56, 57 extend from front 42 toward back 59. Ribs 60, 61 are so positioned as to form slot 62 therebetween which is centered between sides 56, 57.

An end of continuous outlet cable 30 is inserted into the end cap 40 through the completely open side thereof until the cable aperture 63 is opposite cap aperture 64. Now the back surface of cable body portion 31 abuts the inner surface of cap back 59 and polarizing rib 35 is entered into slot 62. It is to be noted that slot 62 is much wider than rib 35 so that the same cap 40 may be secured at each end of cable 30.

The inner surface of cap back 59 is cemented to cable 30 so that end caps 40 will not come free of cable 30 before it is installed and in that way neither of the caps 40 can accidentally be omitted from the installation. End cap apertures 64 and cable apertures 63 are adapted to receive cable mounting screws 22, 25. Cable 30 is also provided with two other pre-punched apertures (not shown) to receive mounting screws 23, 24.

Feed-in plug 55 is comprised of a deformable body 65' constructed preferably of a plastic insulating material, and a pair of contact members 65, 66 constructed of conducting sheet material. Each of the contact members 65, 66 is identical so that for the sake of brevity only one contact member 66 shall be described. This contact member 66 includes a wire connecting portion 67, and at approximately right angles thereto, a conductor engaging portion 68. The free end of wire engaging portion 67 is provided with tongue 69 which is crimped over to electrically and mechanically secure wire 53 to contact member 66. A similar connection electrically and mechanically secures wire 54 to contact member 65. The free end of conductor engaging portion 68 is provided with a plurality of sharp projections 70 which will engage the cable conductor 38.

Body 65' comprises a main portion 71 and an integrally formed auxiliary portion 72 reduced in height over main portion 71. The wire connecting portions 67 of both contacts 65, 66 are imbedded in body 65' with the conductor engaging portions 68 projecting from auxiliary portion 72 extending in opposite directions in a single plane coinciding substantially with the back surface 73 of auxiliary portion 72. A V-shaped metallic spring 74 is mounted in pocket 75, positioned between contact members 65, 66 and retained therein by lip 76.

Contact members 65, 66 may be moved toward one another by applying a compressive force between surfaces 77, 78. Spring pocket 75 facilitates the compressibility of body 65', thus permitting feed-in plug 55 to partially collapse instead of requiring compression of the body material. When the compression force is released spring 74 returns the contacts to the position of FIGURES 4 and 5. It is to be noted that the height of body 65, that is, the distance between surfaces 77, 78, is slightly greater than the width of cable body portion 31. This aids in compressing plug 55 and thereafter sliding plug 55 along cable 30.

When feed-in plug 55 is mounted to cable 30, polarizing slot 79, formed in auxiliary portion 72, receives polarizing rib 35. The contact engaging portions 68 of contact members 65, 66 are disposed within slots 37, 36 in engagement with conductors 39, 38. Spring 74 urges the sharp points 70 into engagement with conductors 38, 39 with a force sufficient to penetrate any layers of dirt or paint which may have accumulated on the conductors 38, 39.

Spring 74 also urges contact members 65, 66 firmly against conductors 39, 38 so that plug 55 will not accidently be moved. If desired, a screw 19 may also be utilized to secure plug 55 in place with respect to cable 30. In the latter event spring 74 is provided with a clearance hole (not shown) for the passage of screw 19.

When the compressive force is applied between surfaces 77, 78 contacts 65, 66 are moved along converging paths a distance sufficient to relax the high pressure between points 70 and conductors 38, 39 so that feed-in plug 55 may be moved to any desired location along the length of cable 30. However, it is to be noted that feed-in plug 55 cannot be dismounted from cable 30 without first removing one of the end caps 40. That is, the free ends of the conductor engaging portions 68 are still confined by lips 32, 33 within slots 36, 37 and rib 35 cooperates with slot 79 to prevent rotation of plug 65 with respect to cable 30.

The feed-in plug 55 is designated as a flexible type while the feed-in plug 80 illustrated in FIGURES 7-9 is of a non-flexible type. Feed-in plug 80 comprises a case 99 of rigid insulating material molded with contact recesses 81, 82 extending from the back surface 85 to wire recesses 83, 84, respectively. Wire receiving recesses 83, 84 are separated at the sides thereof by barrier 86 while one of the ends of wire recesses 83, 84 communicate with a flexible cable receiving slot 87 which extends inwardly from the case end surface 88.

An individual contact member 89, 90 is provided for each of the recesses 81, 82, respectively. Since contact members 89, 90 are identical the same reference numerals are utilized for the portions of each member. Each of the members 89, 90 is formed of conducting sheet material and comprises a first portion 91 and a second portion 92 at right angles thereto. The free end of first portion 91 is provided with large sharp teeth 93 while the free end of second portion 92 is provided with small sharp teeth 94.

Contact members 89, 90 are mounted to case 99 with the first portions 91 disposed within contact recesses 81, 82 and the second portions 92 extend in opposite directions and are positioned in a plane with back surface 85. The large sharp teeth 93 extend into wire recesses 83, 84.

Flexible cable 95 comprises two stranded wires 96, 97 each having an insulating covering 98. Cable 95 is entered into slot 87 and the end thereof split so that wire 96 is disposed within recess 83 and wire 97 is disposed within recess 84.

Cover member 100 is secured to case by screw 101 which is entered into a threaded aperture of barrier 86. Cover member 100 is formed with formations 103 and 104 which are entered into wire recesses 83, 84, respectively. When screw 101 is rotated to draw cover 100 toward barrier 86, formations 103, 104 bear against insulation 98 forcing it to be pierced by large teeth 93 so that wires 96, 97 are electrically connected to contact members 89, 90, respectively.

Contact members 89, 90 are also being forced toward back surface 85. Recesses 81, 82 are partially defined by cam surfaces 104', 105, respectively, while the junctions 106 between the first and second portions 91, 92 of both contact members 89, 90 are rounded. Thus, the rounded junctions 106 cooperate with the cam surfaces 104', 105 to force the second contact portions 92 in diverging directions so as to firmly seat small sharp teeth 94 against the conductors 38, 39 of continuous outlet cable 30, thereby electrically connecting plug 80 to cable 30.

It is to be noted that case 99 is provided with a polarizing slot 107 in the back surface 85 thereof which cooperates with polarizing rib 35 of cable 30. Thus, plug 80 may be mounted to cable 30 only with contact member 89 contacting conductor 38 and contact member 90 contacting conductor 39.

Now referring more particularly to FIGURES 11–15B wherein a completely polarized electric distribution system is illustrated, that is, all the components of the extension assembly can only be energized in a predetermined relationship since a predetermined conductor is the one that is grounded. This is accomplished by providing the wall receptacle 120 with wide and narrow prong receiving apertures 121, 122, respectively. The prong engaging contacts (not shown) of receptacle 120 positioned in alignment with wide apertures 121 are connected to system ground, while the other prong engaging contacts (not shown) positioned in alignment with narrow aperture 122 are ungrounded.

Plug cap 123 of energizing extension 124 is provided with a narrow prong 126 and a wide prong 127 which is too wide to be inserted through narrow aperture 122 but is narrow enough to be received by wide aperture 121.

The two wires (not shown) of flexible cable 128 electrically connect the contacts 65, 66 of feed-in plug 55 to prongs 127, 126, respectively, of plug cap 123. The polarizing notch 79 of plug 55 is closer to contact 66 than to contact 65. Since the distance Y from lip 32 to polarizing rib 35 is less than the distance X from lip 33 to polarizing rib 35 the auxiliary portion 72 of body 65' will only permit plug 55 to be mounted to cable 30 with contact 66 engaging conductor 38 and contact 65 engaging conductor 39. Thus conductor 39 is grounded.

Similarly, twist type removable receptacle 47 can be mounted to cable 30 only with contact 148 engaging grounded conductor 39 and contact 149 engaging the non-grounded conductor, or hot wire, 38. This is accomplished by appropriately shaping receptacle insert 150 with an off-center notch 151 to receive polarizing rib 35.

The receptacle case 152, rotatable with respect to insert 150, includes a wide and a narrow prong receiving aperture 153, 154, respectively. When receptacle 47 is mounted to cable 30, wide aperture 153 is aligned with the prong receiving contact (not shown) which is electrically connected to contact member 148 and the narrow aperture 154 is aligned opposite the prong receiving contact (not shown) which is electrically connected to contact member 149.

Thus, if the extension cords for energizing the appliances are provided with a plug cap having a wide and a narrow prong, in the manner of plug cap 123, then the wide prong will always be connected to circuit ground and the narrow prong will always be connected to the hot wire. With this arrangement, if the appliance is internally fused, the appliance may be constructed with the fuse in the hot line.

Although we have here described preferred embodiment of our novel invention, many variations and modifications will now be apparent to those skilled in the art, and we therefore prefer to be limited not by the specific disclosure herein, but only by the appending claims.

We claim:

A continuous outlet surface extension assembly comprising an elongated continuous outlet cable of selected convenient length, an energizing extension assembly having a first end operatively connected to said cable and a second end adapted for connection to a source of electrical energy, and at least one electric receptacle removably mounted to said cable and after dismounting being mountable to said cable at any point along the length thereof; said cable comprising an elongated insulating body, a first and a second longitudinally extending lip formed integrally with and overlying a first surface of said body to form a first and a second slot; a first and second longitudinally extending conductor partially imbedded in said body and accessible through said first and second slots respectively; insulating cap means at each end of said cable; a longitudinally extending polarizing rib projecting from said first surface of said body and positioned to one side of a line located midway between said conductors; said receptacle including a housing having a depression operatively positioned to receive said rib and further to cooperate therewith to assure that said receptacle is mounted to said cable in a predetermined manner; said extension assembly including a feed-in plug at said first end mounted to said cable; said feed-in plug including a first and a second contact each comprising a sheet-like free end portion having a sharp edge for contact with said first and second conductors, respectively; said end caps and said lips cooperating to prevent removal of said feed-in plug from said cable; said feed-in plug being movable along the length of said cable without being dismounted therefrom; said feed-in plug including means urging said free end portions in opposite directions in the planes thereof, thereby urging said sharp edges firmly into engagement with said conductors whereby said feed-in plug will not accidentally be moved; said last recited means comprising a spring; said feed-in plug also including a yieldable body in which said spring is disposed; said electric receptacle having a first prong receiving aperture of a first length and a second prong receiving aperture of a second length greater than said first length; said energizing assembly including a plug cap at its said second end; said plug cap including a first and second prong electrically connected to said first and said second flexible conductors; said first prong being wider than said second prong; said first prong being too wide to be received by an aperture of said first length but not too wide to be received by an aperture of said second length; said second prong being narrow enough to be received by an aperture of said first length; said plug cap prongs, said polarizing rib and said electric receptacle depression and prong receiving apertures cooperating to provide a completely polarized system for providing electrical energy which prevents incorrect usage thereof.

(References on following page)

References Cited in the file of this patent

UNITED STATES PATENTS

| | | |
|---|---|---|
| 2,042,105 | Kelley | May 26, 1936 |
| 2,105,833 | Feuer et al. | Jan. 18, 1938 |
| 2,119,777 | Clayton | June 7, 1938 |
| 2,267,080 | Clayton | Dec. 23, 1941 |
| 2,332,766 | Von Gehr | Oct. 26, 1943 |
| 2,348,665 | Von Gehr | May 9, 1944 |
| 2,924,802 | Platz | Feb. 9, 1960 |

FOREIGN PATENTS

| | | |
|---|---|---|
| 1,122,807 | France | May 28, 1956 |
| 1,014,193 | Germany | Aug. 22, 1957 |